United States Patent Office 3,193,493
Patented July 6, 1965

3,193,493
CATALYTIC CRACKING PROCESS WITH A CATALYST COMPOSITION COMPRISING AN ALUMINOSILICATE CONTAINING BERYLLIUM
Jean M. Bourguet and Francis D. Hart, Woodbury, N.J., assignors to Socony Mobil Oil Company, Inc., a corporation of New York
No Drawing. Filed Oct. 17, 1960, Ser. No. 62,870
4 Claims. (Cl. 208—120)

This invention relates to an improved process for effecting conversion of hydrocarbons. More particularly, the present invention is directed to a process for cracking a hydrocarbon oil heavier than gasoline by subjecting the same to contact under catalytic cracking conditions with an unusual catalyst characterized by the ability to afford an exceptionally high conversion of said oil with accompanying enhanced yield of gasoline and an unusually effective production of isobutane. A high yield of the latter component is especially desirable for use in alkylation reactions involving condensation with olefins to form high octane, branched-chain hydrocarbons (alkylate) suitable for use in aviation gasoline and as blending components in motor fuels.

The invention is further directed to an improved aluminosilicate cracking catalyst characterized by unusual activity, selectivity and stability to deactivation by steam. The catalyst described herein further possesses exceptional resistance to nitrogen deactivation and is thus particularly adapted to treatment of charge stocks high in nitrogen content. As is well known, there are numerous materials both of natural and synthetic origin which have the ability to catalyze the cracking of hydrocarbons. However, the mere ability to catalyze cracking is far from sufficient to afford a catalyst of commercial significance. Of the presently commercially available cracking catalysts, a synthetic silica-alumina composite catalyst is by far the most widely used. While such type catalyst is superior in many ways to the earlier employed clay catalysts and is fairly satisfactory, it is subject to improvement particularly in regard to its ability to afford a high yield of useful product with a concomitant small yield of undesirable product.

Thus, commercial catalytic cracking has been carried out by contacting a hydrocarbon charge in the vapor or liquid state with a catalyst of the foregoing type under conditions of temperature, pressure and time to achieve substantial conversion of the charge to lower boiling hydrocarbons. The reaction which takes place is essentially a cracking to produce lighter hydrocarbons but is accompanied by a number of complex side reactions such as aromatization, polymerization, alkylation and the like. As a result of these complex reactions a carbonaceous deposit is laid down on the catalyst commonly called "coke." The deposition of coke tends to seriously impair the catalytic efficiency of the catalyst for the principal reaction and the conversion reaction is thereafter suspended after coke to the extent of a few percent by weight has accumulated on the catalyst. The catalytic surface is then regenerated by burning the coke in a stream of oxidizing gas and the catalyst is returned to the conversion stage of the cycle.

As will be realized, coke and other undesired products are formed at the expense of useful products such as gasoline. It will also be evident that during the period of regeneration the catalyst is not being effectively employed for conversion purposes. It accordingly is highly desirable not only to afford a large over-all conversion of the hydrocarbon charge, i.e. to provide a catalyst of high activity, but also to afford an enhanced yield of useful product such as gasoline while maintaining undesired products such as coke at a minimum. The ability of a cracking catalyst to so control and direct the course of conversion is referred to as selectivity. Thus, an exceedingly useful and widely sought characteristic in a cracking catalyst is selectivity.

Another important property of a commercial cracking catalyst is the ability to resist poisoning by nitrogen when utilized in effecting conversion of a high nitrogen content charge stock.

Still another important property desirable in a cracking catalyst is steam stability, i.e. the ability not to become deactivated in the presence of steam at an excessively high rate. As a result of coke formation, it has generally been necessary to regenerate the catalyst at frequent intervals first by stripping out entrained oil by contacting with steam and then burning off carbonaceous deposits by contacting with an oxygen-containing gas at an elevated temperature. However, it has been found that the cracking activity of the catalyst deteriorates upon repeated use and regeneration and that the silica-alumina catalysts heretofore employed are very sensitive to steam. Since steaming has been found to be the most effective way of removing entrained oil from the catalyst prior to regeneration with air and since steam is encountered in the seals and kiln of a commercial catalytic cracking unit, it is apparent that a catalyst characterized by good steam stability is definitely to be desired.

In accordance with the present invention, there has now been discovered a catalyst possessing the unique combination of the above-described desirable characteristics. The catalyst of the present invention comprises a rare earth metal, beryllium, mixed rare earth metal-beryllium or mixed rare earth metal-calcium aluminosilicate, resulting from base-exchange of a crystalline alkali metal aluminosilicate having uniform pore openings between 6 and 15 Angstrom units with rare earth metal, beryllium, a mixture of rare earth metal and beryllium or a mixture of rare earth metal and calcium ions to replace at least about 75 percent of the original alkali metal content of said alkali metal aluminosilicate with said ions and to effectively reduce the alkali metal content of the resulting composite to below 4 percent by weight, washing the base-exchanged material free of soluble anions, drying and thereafter thermally activating the product by heating at a temperature in the approximate range of 500° F. to 1200° F. for a period of between about 1 and about 48 hours.

In one embodiment, the present invention thus affords a process for cracking heavy petroleum hydrocarbons to lighter materials boiling in the range of gasoline in the presence of a rare earth, beryllium, mixed rare earth-beryllium, or mixed rare earth-calcium aluminosilicate having pore openings.

In another embodiment, the present invention provides a process for effecting conversion of hydrocarbons by contacting the same with a catalyst having exceptional stability, activity and selectivity prepared by contacting a crystalline alkali metal aluminosilicate zeolite having uniform pore openings between 6 and 15 Angstrom units with a solution containing ions of metals selected from the group consisting of rare earth metals, beryllium, mixtures of rare earth metals and beryllium and mixtures of rare earth metals and calcium to effect base exchange of at least about 75 percent of the alkali metal ions of said zeolite with the aforesaid metal ions and to effectively reduce the content of alkali metal of the resulting composite to below 4 percent by weight, washing the base-exchanged material free of soluble anions, drying and thermally activating the washed product by heating to a temperature in the approximate range of 500° F. to 1200° F. to effect at least partial conversion of the metal ion introduced by base-exchange to a catalytically active state.

Another embodiment of the invention affords a process for cracking heavy petroleum hydrocarbons to lighter materials boiling in the gasoline range by contacting the same under catalytic cracking conditions with a catalyst resulting from contact with a crystalline alkali metal aluminosilicate zeolite having uniform port openings between 6 and 15 Angstrom units with a solution of an ionizable rare earth metal compound, beryllium compound, a mixture of rare earth metal and beryllium compounds or a mixture of rare earth metal and calcium compounds to replace, by base-exchange, at least 75 percent and preferably more than 90 percent of the alkali metal content of said zeolite with the aforementioned metals and to effectively reduce the alkali metal content thereof below about 4 percent and preferably to less than about 1 percent by weight, washing the base-exchanged material free of soluble anions, drying and thermally activating the washed product by heating to a temperature in the approximate range of 500° F. to 1200° F. for a period of between about 1 and about 48 hours.

In still another embodiment, the invention provides an improved cracking catalyst consisting essentially of beryllium aluminosilicate resulting from base-exchange of a crystalline alkali metal aluminosilicate having uniform pore openings between 6 and 15 Angstrom units with beryllium ions to replace at least about 75 percent and preferably at least 90 percent of the original alkali metal content of the aluminosilicate with beryllium ions and to effectively reduce the alkali metal content of the resulting composite to below about 4 percent by weight and preferably less than 1 percent by weight, washing the base-exchanged material free of soluble anions, drying and thereafter thermally activating the product by heating at a temperature in the approximate range of 500° F. to 1200° F. for a period of between about 1 and about 48 hours.

In another embodiment, the invention affords an improved cracking catalyst consisting essentially of a mixed rare earth-beryllium aluminosilicate resulting from base-exchange of a crystalline alkali metal aluminosilicate having uniform pore openings between 6 and 15 Angstrom units with a mixture containing rare earth metal and beryllium ions to replace at least about 75 percent and preferably at least about 90 percent of the original alkali metal content of the aluminosilicate with rare earth metal and beryllium ions and to effectively reduce the alkali metal content of the resulting composite to below 4 and preferably less than 1 percent by weight, washing the base-exchanged material free of soluble anions, drying and thereafter thermally activating the product by heating in the approximate range of 500° F. to 1200° F. for a period of between about 1 and about 48 hours.

In still a further embodiment, the invention affords an improved cracking catalyst consisting essentially of a mixed rare earth-calcium aluminosilicate resulting from base-exchange of a crystalline alkali metal aluminosilicate having uniform pore openings between 6 and 15 Angstrom units with a mixture containing rare earth metal and calcium ions to replace at least about 75 percent and preferably at least about 90 percent of the original alkali metal content of the aluminosilicate with rare earth metal and calcium ions and to effectively reduce the alkali metal content of the resulting composite to below 4 and preferably less than 1 percent by weight, washing the base-exchanged material free of soluble anions, drying and thereafter thermally activating the product by heating at a temperature in the approximate range of 500° F. to 1200° F. for a period of between about 1 and about 48 hours.

The crystalline alkali metal aluminosilicates employed in preparation of the catalysts described herein are zeolites. Such substances have been generally described by Barrer in several publications and in U.S. 2,306,610 and U.S. 2,413,134. These materials are essentially the dehydrated forms of crystalline natural or synthetic hydrous siliceous zeolites containing varying quantities of alkali metal and aluminum with or without other metals. The alkali metal atoms, silicon, aluminum and oxygen in these zeolites are arranged in the form of an aluminosilicate salt in a definite and consistent crystalline pattern. The structure contains a large number of small cavities, interconnected by a number of still smaller holes or channels. These cavities and channels are precisely uniform in size. The alkali metal aluminosilicate zeolite used in preparation of the catalysts described herein has a uniform pore structure comprising openings characterized by an effective pore diameter of between 6 and 15 Angstroms.

In general, the process for preparing such alkali metal aluminosilicates involves heating, in aqueous solution, an appropriate mixture of oxides, or of materials whose chemical composition can be completely represented as a mixture of oxides $Na_2O$, $Al_2O_3$, $SiO_2$ and $H_2O$ at a temperature of approximately 100° C. for periods of 15 minutes to 90 hours or more. The product, which crystallizes within this hot mixture is separated therefrom and water washed until the water in equilibrium with the zeolite has a pH in the range of 9 to 12 and thereafter is dehydrated by heating.

Generally, an alkali metal silicate serves as the source of silica and an alkali metal aluminate as the source of alumina. An alkali metal hydroxide is suitably used as the source of the alkali metal ion and, in addition, contributes to the regulation of the pH. All reagents are preferably soluble in water. While it is contemplated that alkali metal aluminosilicates having the above-designated pore characteristics may be employed in preparation of the described catalysts, it is generally preferred to use a sodium aluminosilicate. Thus, assuming sodium as the alkali metal, the reaction mixture should contain a molar ratio of $Na_2O/SiO_2$ of at least 0.5/1 and generally not in excess of 2/1. Soduim aluminate having a molar ratio of $Na_2O/Al_2O_3$ in the range of 1/1 to 3/1 may be employed. The amounts of sodium silicate solution and sodium aluminate solutions are such that the mol ratio of silica to alumina in the final mixture is at least 2.2/1. Preferably, the reaction solution has a composition expressed as mixtures of oxides within the following ranges $SiO_2/Al_2O_3$ of 3 to 5, $Na_2O/SiO_2$ of 1.2 to 1.5 and $H_2O/Na_2O$ of 35 to 60. The reaction mixture is placed in a suitable vessel which is closed to the atmosphere in order to avoid losses of water and the reagents are then heated for an appropriate length of time. A convenient and generally employed process for making the sodium aluminosilicate reactant involves preparing an aqueous solution of sodium aluminate and sodium hydroxide and then adding with agitation an aqueous solution of sodium silicate. While satisfactory crystallization may be obtained at temperatures from 21° C. to 150° C., the pressure being atmospheric or less, corresponding to the equilibrium of the vapor pressure with the mixture at the reaction temperature, crystallization is ordinarily carried out at about 100° C. As soon as the zeolite crystals are completely formed, they retain their structure and it is not essential to maintain the temperature of the reaction any longer in order to obtain a maximum yield of crystals.

After formation, the crystalline zeolite is separated from the mother liquor, usually by filtration. The crystalline mass is then washed, preferably with water and while on the filter, until the wash water, in equilibrium with the zeolite, reaches a pH of 9 to 12. The sodium aluminosilicate crystals are then dried, generally at a temperature between 25° C. and 150° C.

The catalysts utilized in the present process are prepared by base-exchanging a crystalline alkali metal aluminosilicate, such as described hereinabove, having a structure of rigid three dimensional networks characterized by a uniform effective pore diameter between 6 and 15 Angstrom units with beryllium, rare earth metal, a mixture of beryllium and rare earth metal ions wherein the ratio of beryllium to rare earth metal ions is in the approximate range of 10/1 to 1000/1, or a mixture of calcium and rare earth metal ions, the ratio of calcium to rare earth metal ions in the latter instance replacing the alkali metal preferably being in the range of 2/1 to 100/1, washing the resulting base-exchanged material free of soluble anions, drying the washed composite and subjecting the same to a thermal activating treatment.

The base-exchange solutions employed may be contacted with the crystalline zeolite of uniform pore structure in the form of a fine powder, a compressed pellet, extruded pellet or other suitable particle shape. When in the form of a pellet, the crystalline zeolite may be combined with a binder such as clay. It has been established that the desired base-exchange may be effected most readily if the alkali metal aluminosilicate zeolite undergoing treatment has not previously been subjected to a temperature above about 600° F.

Base exchange required for introducing the aforementioned metal ions may be accomplished by contacting the alkali metal aluminosilicate zeolite for a sufficient period of time and under appropriate temperature conditions to replace at least about 75 percent and preferably at least about 90 percent of the alkali metal originally contained in the aluminosilicate zeolite with ions of rare earth metal, beryllium, a mixture of rare earth metal and beryllium or a mixture of rare earth metal and calcium to effectively reduce the content of alkali metal of the resulting composite to below 4 weight percent and preferably less than 1 weight percent. When the base exchange is effected by bringing the alkali metal aluminosilicate zeolite into contact with a solution containing calcium and rare earth metal ions, the ratio of the former to the latter ions is preferably in the range of 2/1 to 100/1, to thereby effect replacement of the alkali metal ion of the zeolite with calcium and rare earth metal ions in the above designated ratio.

It is contemplated that any of the readily available calcium, beryllium and rare earth metal compounds may be employed for the above purpose. Generally, compounds will be used wherein the metal-containing ion is present in the cationic state. Inorganic salts will usually be employed. Thus, suitable beryllium compounds include beryllium sulfate, beryllium orthophosphate, beryllium nitrate, beryllium chloride and beryllium bromide. Suitable calcium compounds include calcium chloride, calcium bromide, calcium iodide, and calcium nitrate. Representative rare earth metal compounds include nitrates, bromides, acetates, chlorides, iodides and sulfates of one or more of the rare earth metals including cerium, lanthanum, praseodymium, neodymium, illinium, samarium, europium, gadolinium, terbium, dysprosium, holmium, erbium, thulium, ytterbium, and lutecium. Naturally occurring rare earth minerals offer a convenient source for the rare earth metals. The natural rare earth metal-containing mineral may be extracted with an acid such as sulfuric, or rare earth oxides and related metal oxides in admixture from a natural earth may be dissolved in other solubilizing acids such as acetic. For example, monazite which contains cerium compounds as the principal rare earth metal compound present with lesser portions of thorium compounds and other rare earth compounds may be used as a suitable source of cerium. Mixtures of rare earth metal salts, for example, chlorides of lanthanum, cerium, praseodymium, neodymium, samarium, and gadolinium available commercially at a relatively low cost may be effectively employed.

While water will ordinarily be the solvent in the base-exchange solutions used, it is contemplated that other solvents, although generally less preferred, may be used; in which case, it will be realized that the above list of representative compounds may be greatly expanded. Thus, in addition to aqueous solutions, alcoholic solutions, etc. of the beryllium, calcium and rare earth metal-containing compounds may be employed in producing the catalyst utilized in the persent process. It will be understood that such metal compounds employed undergo ionization in the particular solvent used.

The concentration of metal compound employed in the base-exchange solutions may vary depending on the alkali metal aluminosilicate undergoing treatment and on the conditions under which treatment is effected. The overall concentrations of replacing metal ions, however, is such as to reduce the alkali metal content of the original alkali metal aluminosilicate to less than 4 and preferably less than 1 weight percent. In base-exchanging the alkali metal aluminosilicate with a solution of rare earth, beryllium, rare earth-beryllium or rare earth-calcium compounds, generally the concentration of metal compound is within the range of 20 to 30 percent by weight.

The temperature at which base-exchange is effected may vary widely, generally ranging from room temperature to an elevated temperature below the boiling point of the treating solution. The volume of base-exchange solution employed in ay instance may vary widely. Generally, however, an excess is employed and such excess is removed from contact with the crystalline aluminosilicate zeolite after a suitable period of contact. The time of contact between the base exchange solution and crystalline zeolite in any instance is such as to effect substantial replacement of the alkali metal ions thereof with beryllium, rare earth metal, mixtures of beryllium and rare earth metal and mixtures of calcium and rare earth metal ions. It will be appreciated that such period of contact vary widely depending on the temperature of the solution, the nature of the alkali metal aluminosilicate used, the particular metal compounds employed. Thus, the time of contact may extend from a brief period of the order of a few hours for small particles to longer periods of the order of days for large pellets. Generally, the time of contact will, depending on the various aforementioned factors, be within the range of 8 to 80 hours.

After the final base exchange treatment, the crystalline zeolite is removed from the treating solution. Anions introduced as a result of treating with the base exchange solutions are removed by water-washing the treated composite for such period of time until the same is free of said anions. The washed product is then dried, generally in air, to remove substantially all of the water therefrom. While drying may be effected at ambient temperature, it is generally more satisfactory to facilitate the removal of moisture by maintaining the product at a temperature between about 150 and about 600° F. for 4 to 48 hours.

The dried material is then subjected to an activating treatment essential to render the final composition catalytically active. Such treatment entails heating the dried material generally in air to a temperature within the approximae range of 500° F. to 1200° F. for a period of between 1 and 48 hours. The ultimate catalyst product has a surface area within the approximate range of 50 to 500 square meters per gram and generally contains between about 0.1 and about 20 weight percent of replacing metal, i.e. rare earth metal, beryllium, rare earth metal-beryllium mixture, or rare earth metal-calcium mixture, between about 0.1 and about 4 weight percent sodium, between about 44 and about 34 weight percent alumina and between about 55 and about 42 weight percent silica.

Cracking, utilizing the catalyst described herein, may be carried out at catalytic cracking conditions, the catalyst being in the form of fine particles, granules, pellets, beads or the like. The temperature employed is within the approximate range of 600° F. to 1200° F. and pressure ranges from sub-atmosphric pressure up to several hundred atmospheres. It is particularly to be noted that the present catalyst is characterized by the ability to crack hydrocarbons in liquid phase at temperatures as low as 600° F. The contact time of the oil with the catalyst is adjusted in any case according to the conditions, the particular oil feed and the particular results desired to give a substantial amount of cracking to lower boiling products. Cracking may be effected in the presence of the catalyst described herein utilizing well known techniques including, for example, those wherein the catalyst is employed as a fluidized mass or as a compact particle-form moving bed.

The cracking activity of the catalyst is a measure of its capacity to catalyze conversion of hydrocarbons and is expressed herein as the percentage conversion of a Mid-Continent gas oil having a boiling range of 450 to 935° F. to gasoline having an end point of 410° F. by passing vapors of the said gas oil through the catalyst at 875° F., substantially atmospheric pressure, using a catalyst to oil ratio of 1.33 and 5 to 10 minute runs between regenerations.

Steam stability of the catalyst described herein was determined by an accelerated test which simulates the conditions encountered during catalyst use. In this test, the catalyst is contacted with 100 percent steam at 1200° F. and a pressure of 15 p.s.i.g. for a specified interval of time and the cracking activity is then determined and compared with the cracking activity of fresh, unsteamed catalyst. The results thus obtained are indicative of the stability of the catalyst.

The following examples will serve to illustrate the process of the invention without limiting the same:

EXAMPLE 1

A crystalline sodium aluminosilicate having a uniform pore structure comprising openings characterized by an effective pore diameter in the range of 6 to 15 Angstroms was prepared from the following solutions.

Solution A—7% aqueous sodium hydroxide solution:

|  | Lbs. |
|---|---|
| Sodium Hydroxide (NaOH) pellets (containing 75.5 wt. percent $Na_2O$) | 22 |
| Water | 286 |
|  | 308 |

Specific gravity of solution 1.077 at 68° F.

Solution B—Sodium silicate solution:

|  | Lbs. |
|---|---|
| Solution A (7% NaOH) | 154 |
| Sodium Silicate (containing 8.8% $Na_2O$, 28.5% $SiO_2$, 62.7% $H_2O$ and having a specefic gravity at 60° F. of 1.392) | 77.5 |
|  | 231.5 |

Specific gravity of solution 1.172 at 68° F.

Solution C—Sodium aluminate solution:

|  | Lbs. |
|---|---|
| Solution A (7% NaOH) | 154 |
| Water | 51.6 |
| Sodium aluminate power (containing 43.5% $Al_2O_3$ and 30.2% $Na_2O$) | 25.6 |
|  | 231.2 |

Specific gravity of solution 1.138 at 68° F.

Solution C was poured into Solution B with vigorous agitation at room temperature. Lumps of gel formed which were broken by vigorous mixing. The entire mass was mixed thoroughly to a cream-like consistency. Such mixture was placed in containers of about 5 gallons capacity each These containers were introduced into a water bath and allowed to stand at 205° F. therein for 17 hours without agitation. At the end of this period, there was found to have formed in the containers a flocculent precipitate beneath a clear supernatant liquid. The containers were then removed from the bath. The preperature until the pH of the filtrate was below 11.5. The resulting aluminosilicate crystalline product was dried in air at a temperature of approximately 250° F. and upon analysis was found to have a sodium content of 14.4 weight percent.

One-half (0.5) pound of the above crystalline sodium aluminosilicate was contacted at 150° F. with 750 cc. of an aqueous solution containing 1.0 pound of the chlorides of a rare earth metal mixture having the following composition:

|  | Percent wt. |
|---|---|
| Cerium (as $CeO_2$) | 20 |
| Lanthanum (as $La_2O_3$) | 11 |
| Praseodymium (as $Pr_6O_{11}$) | 3 |
| Neodymium (as $Nd_2O_3$) | 9 |
| Samarium (as $Sm_2O_3$) | 1 |
| Gadolinium (as $Gd_2O_3$) | 0.3 |
| Other rare earths | 0.1 |

A stream of nitrogen was bubbled through the mixture to provide continuous agitation. Every 24–48 hours, the solid was filtered, washed and contacted with fresh rare earth metal chloride solution as above. The rate of replacement by base exchange of the sodium ions with rare earth metal ions is shown below.

| No. of solution changes: | Percent weight sodium remaining after exchange |
|---|---|
| 0 | 14.4 |
| 13 | 3.5 |
| 16 | 1.6 |
| 21 | 1.2 |

Exchange was carried out as above over a period of 60 days at which time 97.7 percent of the original sodium content of the crystalline aluminosilicate had been replaced with rare earth metal ions. The product so obtained was filtered, washed, dried and pelleted to ⅛ x ¹⁄₁₆″ particles. The pellets, upon being subjected to crystallinity analysis, were found to possess a partially crystalline structure. The pellets were then heat treated for 3 hours at 1100° F. and steam treated for 10 hours at 1200° F. and a pressure of 15 p.s.i.g. The pellets, after such treatment, were again subjected to crystallinity analysis. It was found that steaming had no effect on crystallinity.

The rare earth metal aluminosilicate pellets resulting from the above preparation were employed in the cracking of a gas oil utilizing a temperature of 875° F., a liquid hourly space velocity of 4.5 and a catalyst to oil ratio of 1.33. The results obtained from such cracking are set forth in Table I hereinbelow, wherein comparison is made between such results and those obtained under identical cracking conditions with the above described sodium aluminosilicate as well as aluminosilicates in which the sodium ion has been base-exchanged, in the manner above-described with reference to rare earth metal, with various other ions including lithium, barium, potassium, cobalt, magnesium, cadmium, strontium and calcium.

Table I

| Sieve cation | Na | | Li | | Ba | K | | Co | | Mg | | Cd | | Sr | | Ca | | Rare earth metal | |
|---|---|---|---|---|---|---|---|---|---|---|---|---|---|---|---|---|---|---|---|
| Percent cation substitution | 88.0 | | 92.3 | | | 88.4 | | 89.8 | | 93.2 | | 92.0 | | 98.5 | | 94.1 | | 97.7 | |
| Conversion[1] | 24.4 | | 10.3 | | 15.7 | 21.3 | | 22.1 | | 32.3 | | 39.7 | | 44.9 | | 48.7 | | 90.0 | |
| C₄-free gasoline[1] | 13.0 | | 6.2 | | 8.0 | 9.8 | | 12.7 | | 23.2 | | 12.0 | | 23.1 | | 31.3 | | 35.5 | |
| Wet gas[1] (Total C₄ and lighter) | 3.2 | | 1.2 | | 2.6 | 2.7 | | 4.9 | | 4.9 | | 6.8 | | 12.2 | | 11.0 | | 35.5 | |
| Wet gas analysis (wt. percent of wet gas): | | | | | | | | | | | | | | | | | | | |
| (a) C₂ and lighter | 39.2 | | 49.5 | | | 42.5 | | 40.3 | | 17.5 | | 50.6 | | 11.2 | | 11.7 | | 12.9 | |

| | Wt. | Vol. | Wt. | Vol. | | Wt. | Vol. | Wt. | Vol. | Wt. | Vol. | Wt. | Vol. | Wt. | Vol. | Wt. | Vol. | Wt. | Vol. |
|---|---|---|---|---|---|---|---|---|---|---|---|---|---|---|---|---|---|---|---|
| Hydrogen, percent | 2.5 | 22.4 | 2.5 | 22.9 | | 4.6 | 35.0 | 45.0 | 90.4 | 5.8 | 43.0 | 42.8 | 88.0 | 3.7 | 31.4 | 2.3 | 22.1 | 2.9 | 25.4 |
| Hydrogen sulfide, percent | 0.0 | 0.0 | 0.0 | 0.0 | | 0.0 | 0.0 | 0.0 | 0.0 | 2.4 | 1.0 | 0.0 | 0.0 | 1.4 | 0.7 | 3.1 | 1.7 | 1.9 | 1.0 |
| Methane, percent | 30.7 | 35.5 | 27.9 | 32.4 | | 33.2 | 32.1 | 18.6 | 4.7 | 28.1 | 25.9 | 34.4 | 8.9 | 25.8 | 27.3 | 24.8 | 29.8 | 33.1 | 36.3 |
| Ethylene, percent | 26.7 | 17.7 | 32.0 | 21.4 | | 23.8 | 13.1 | 17.5 | 2.4 | 30.6 | 15.0 | 10.0 | 1.4 | 37.5 | 22.7 | 38.8 | 26.4 | 24.3 | 15.2 |
| Ethane, percent | 40.1 | 24.4 | 37.6 | 23.3 | | 38.4 | 19.8 | 18.9 | 2.5 | 34.1 | 15.1 | 12.8 | 1.7 | 31.6 | 17.9 | 31.0 | 21.0 | 37.8 | 22.1 |
| | 100.0 | 100.0 | 100.0 | 100.0 | | 100.0 | 100.0 | 100.0 | 100.0 | 100.0 | 100.0 | 100.0 | 100.0 | 100.0 | 100.0 | 100.0 | 100.0 | 100.0 | 100.0 |
| (b) C₃ | 33.4 | | 32.4 | | | 29.3 | | 24.2 | | 33.7 | | 17.5 | | 28.1 | | 26.6 | | 28.6 | |
| Propene, percent wt | 58.0 | | 72.8 | | | 51.0 | | 65.7 | | 62.7 | | 77.2 | | 79.2 | | 82.0 | | 11.0 | |
| Propane, percent wt | 42.0 | | 27.2 | | | 49.0 | | 34.3 | | 37.3 | | 22.8 | | 20.8 | | 18.0 | | 80.0 | |
| | 100.0 | | 100.0 | | | 100.0 | | 100.0 | | 100.0 | | 100.0 | | 100.0 | | 100.0 | | 100.0 | |
| (c) C₄ | 27.4 | | 28.1 | | | 28.2 | | 35.5 | | 48.8 | | 31.9 | | 60.7 | | 61.7 | | 58.5 | |
| Isobutane, percent wt | 0.0 | | 0.0 | | | 0.0 | | 20.9 | | 8.6 | | 12.9 | | 34.8 | | 29.9 | | 66.0 | |
| Butenes, percent wt | 50.5 | | 41.0 | | | 57.4 | | 53.4 | | 73.5 | | 43.4 | | 53.0 | | 58.2 | | 6.9 | |
| n-Butane, percent wt | 49.5 | | 59.0 | | | 42.6 | | 25.7 | | 17.9 | | 43.7 | | 12.2 | | 11.9 | | 27.1 | |
| | 100.0 | | 100.0 | | | 100.0 | | 100.0 | | 100.0 | | 100.0 | | 100.0 | | 100.0 | | 100.0 | |

[1] Wt. percent of charge.

It will be seen from the foregoing data that the extent of conversion achieved with the rare earth metal aluminosilicate as compared with the other metal aluminosilicates was exceptionally high and that, likewise, the yield of gasoline was substantially improved utilizing the rare earth metal aluminosilicate as catalyst in comparison with the other metal aluminosilicates. It will further be seen from the gas analysis set forth that the amount of propane obtained in the C₃ fraction and the amount of isobutane obtained in the C₄ fraction using the rare earth metal aluminosilicate catalyst was unexpectedly high in comparison with the results obtained with the various other metal aluminosilicates.

EXAMPLES 2-4

Rare earth metal aluminosilicates of varying sodium content were prepared as described in Example 1 by base exchange of crystalline sodium aluminosilicate with the rare earth metal chloride mixture. The weight percent sodium contents of the aluminosilicates obtained are shown below.

Example: Percent sodium
2 ------------------------------------------- 0.76
3 ------------------------------------------- 1.23
4 ------------------------------------------- 3.5

The products were utilized as catalysts for cracking a Mid-Continent gas oil under varying conditions of temperature, catalyst to oil ratio and space velocity are shown below in Table II.

It will be seen from the foregoing data that for the rare earth metal aluminosilicate containing 0.76 weight percent sodium, a maximum gasoline yield of 55.6 percent volume at 82.9 percent conversion was obtained at 750° F. Above this temperature gasoline starts to crack as indicated by decreased gasoline yield and the increased gas and coke yield. Increasing the space velocity from 4.5 to 9.0 at 875° F., resulted in a 10 percent increase in gasoline yield with about the same conversion. The rare earth metal aluminosilicate containing 3.5 percent sodium was about as active as the material containing 0.76 percent sodium.

To determine the effect of steam on the rare earth metal aluminosilicate catalyst, the composite containing 3.5 weight percent sodium was treated at mild steaming conditions (8 hours at 900° F.). The cracking results obtained on the steam treated material, as will be seen from Table II, are similar to those obtained with the untreated material. The rare earth metal aluminosilicate containing 1.23 weight percent sodium was also steam treated for 10 hours at 1200° F. at a pressure of 15 p.s.i.g. The gasoline yield was higher and the coke yield lower in this instance for the steam catalyst as compared to the untreated catalyst.

The beneficial results of steam treatment on the catalytic properties of the rare earth metal aluminosilicate catalyst are evident from a consideration of the comparative data set forth in Table III hereinbelow wherein a rare earth metal aluminosilicate prepared by the general

Table II

| | | | | | | | | | | | |
|---|---|---|---|---|---|---|---|---|---|---|---|
| Wt. percent Na in original 13X sieve (H₂O-free) | 14.4 | 14.4 | 14.4 | 14.4 | 14.4 | 14.4 | 14.4 | 14.4 | 14.4 | 14.4 | 14.4 |
| Wt. percent Na after exchange (H₂O-free) | 0.76 | 0.76 | 0.76 | 0.76 | 0.76 | 0.76 | 3.5 | 3.5 | 3.5 | 1.23 | 1.23 |
| CAT-D conditions: | | | | | | | | | | | |
| Temp. (° F.) | 600 | 650 | 714 | 750 | 875 | 875 | 875 | 875 | 875 | 875 | 745 |
| LHSV | 4.5 | 4.5 | 4.5 | 4.5 | 4.5 | 9.0 | 4.5 | 4.5 | 4.5 | 9.0 | 9.0 |
| Catalyst/oil (vol.) | 1.33 | 1.33 | 1.33 | 1.33 | 1.33 | 1.33 | 1.33 | 1.33 | 0.67 | 1.33 | 1.33 |
| Yields: | | | | | | | | | | | |
| Conversion (percent vol.) | 48.4 | 63.0 | 70.4 | 82.9 | 93.2 | 91.1 | 90.9 | [1]92.5 | 73.1 | [2]84.6 | [2]52.9 |
| C₄-free gasoline (percent vol.) | 32.1 | 42.9 | 48.2 | 55.6 | 41.3 | 51.1 | 47.5 | 49.8 | 46.6 | 55.2 | 42.2 |
| Total C₄ (percent vol.) | 6.2 | 10.7 | 14.8 | 20.4 | 37.3 | 30.9 | 30.0 | 30.9 | 20.8 | 24.6 | 6.8 |
| Dry gas (percent wt.) | 1.3 | 3.3 | 4.1 | 6.1 | 15.9 | 12.4 | 12.1 | 12.4 | 8.6 | 9.0 | 2.0 |
| Coke (percent wt.) | 17.3 | 15.9 | 15.9 | 15.9 | 19.0 | 16.6 | 18.0 | 17.8 | 10.1 | 12.6 | 11.3 |

[1] Steam treated 8 hrs. at 900° F., 0 p.s.i.g., 100% steam. [2] Steam treated 10 hrs. at 1200° F., 15 p.s.i.g.

procedure of Example 1 but containing 0.32 weight percent sodium was tested as a cracking catalyst before and after steaming for 162.5 hours at 1200° F. and 15 p.s.i.g. The results, along with those for a rare earth metal aluminosilicate containing 1.23 weight percent sodium which had been steamed for 85 hours at 1200° F. and 15 p.s.i.g. are shown:

*Table III*

| | | | |
|---|---|---|---|
| Wt. percent Na in original sodium aluminosilicate ($H_2O$-free) | 14.4 | 14.4 | 14.4 |
| Wt. percent Na after cation exchange ($H_2O$-free) | 0.32 | 1.23 | 0.32 |
| Surface area (m.²/gm.) | 483 | 449 | -------- |
| Steam treat (1200° F., 15 p.s.i.g.), hrs | 0 | 85 | 162.5 |
| Cracking conditions: | | | |
| Temp. (° F.) | 875 | 875 | 875 |
| LHSV | 9.0 | 9.0 | 9.0 |
| Catalyst/oil (vol.) | 1.33 | 1.33 | 1.33 |
| Yields: | | | |
| Conversion (percent vol.) | 85.9 | 83.1 | 85.8 |
| $C_4$-free gasoline (percent vol.) | 50.4 | 60.9 | 59.0 |
| Total $C_4$ (percent vol.) | 29.0 | 20.7 | 24.5 |
| Dry gas (percent wt.) | 11.0 | 7.5 | 9.5 |
| Coke (percent wt.) | 12.7 | 9.5 | 9.0 |
| Gasoline/coke | 4.0 | 6.4 | 6.6 |
| Light HC analysis (wt. percent chg.): | | | |
| $C_3$ | 8.07 | -------- | 6.46 |
| Normal, percent wt | 81.5 | -------- | 61.5 |
| Olefin, percent wt | 18.5 | -------- | 38.5 |
| $C_4$ | 18.79 | -------- | 16.08 |
| Isobutane, percent wt | 68 | -------- | 62.3 |
| Butylenes, percent wt | 12.3 | -------- | 18.4 |
| n-Butane, percent wt | 19.7 | -------- | 19.3 |

It will be seen from the foregoing data that while no substantial change in activity was observed with the steamed catalyst, an improved product distribution, i.e. the production of more gasoline and less coke, was achieved with the catalyst which had undergone steaming. Accordingly, in a preferred embodiment of the invention, the catalyst after undergoing thermal activating treatment is desirably subjected to treatment with steam at a temperature in the approximate range of 1000 to 1400° F. for a period of at least about 10 hours and, generally, between about 10 and about 200 hours.

EXAMPLE 5

One pound of the crystalline sodium aluminosilicate described in Example 1 was contacted with 750 cc. of an aqueous solution containing 0.5 pound of beryllium chloride at a temperature of 150° F. A stream of nitrogen was bubbled through the mixture to provide continuous agitation. Every 24–48 hours, the solid was filtered, washed and contacted with fresh beryllium chloride solution. The rate of replacement by base-exchange of the sodium ions with beryllium ions is shown below.

| No. of solution changes: | Percent wt. sodium remaining after exchange |
|---|---|
| 0 | 14.4 |
| 5 | 2.4 |
| 16 | 1.0 |

Exchange was carried out as above over a period of 60 days at which time about 95 percent of the original sodium content of the crystalline aluminosilicate had been replaced with beryllium ions. The beryllium content of the product was 1.75 percent by weight on a dry basis. The product so obtained was filtered, washed, dried and pelleted to ⅛ x 1/16″ particles. The particles, upon being subjected to crystallinity analysis, were found to be substantially amorphous.

The beryllium aluminosilicate pellets resulting from the above preparation were employed in the cracking of a gas oil utilizing a temperature of 875° F., a liquid hourly space velocity of 4.5 and a catalyst to oil ratio of 1.33. The results obtained from such cracking together with those obtained using the untreated sodium aluminosilicate are set forth in Table IV below:

*Table IV*

| Sieve cation | Na+ | | Be++ | |
|---|---|---|---|---|
| Percent cation substitution | -------- | | 95.2 | |
| Conversion (wt. percent of charge) | 24.4 | | 52.6 | |
| $C_4$-free gasoline | 13.0 | | 31.1 | |
| Coke | 8.2 | | 4.3 | |
| Gasoline/coke ratio | 1.6 | | 7.2 | |
| Wet gas (wt. percent of charge) (total $C_4$ and lighter) | 3.2 | | 17.2 | |
| Wet gas analysis (wt. percent of wet gas): | | | | |
| (a) $C_2$ and lighter | 39.2 | | 11.8 | |
| | Wt. | Vol. | Wt. | Vol. |
| Hydrogen, percent | 2.5 | 22.4 | 4.4 | 35.0 |
| Hydrogen sulfide, percent | 0.0 | 0.0 | 4.4 | 2.0 |
| Methane, percent | 30.7 | 35.5 | 29.2 | 29.0 |
| Ethylene, percent | 26.7 | 17.7 | 31.0 | 17.7 |
| Ethane, percent | 40.1 | 24.4 | 31.0 | 16.3 |
| | 100.0 | 100.0 | 100.0 | 100.0 |
| (b) $C_3$ | 33.4 | | 27.1 | |
| Propene, percent wt | 58.0 | | 69.6 | |
| Propane, percent wt | 42.0 | | 30.4 | |
| | 100.0 | | 100.0 | |
| (c) $C_4$ | 27.4 | | 61.1 | |
| Isobutane, percent wt | 0.0 | | 46.3 | |
| Butenes, percent wt | 50.5 | | 42.1 | |
| n-Butane, percent wt | 49.5 | | 11.6 | |
| | 100.0 | | 100.0 | |

It will be seen from the above data that the extent of conversion obtained upon replacement of the sodium ions with beryllium ions greatly increased and that, likewise, the yield of gasoline was substantially improved. It will further be evident from the gas analysis that the amount of propene obtained in the $C_3$ fraction and the amount of isobutane obtained in the $C_4$ fraction using the beryllium aluminosilicate catalyst was greatly improved as compared with the unexchanged sodium aluminosilicate.

EXAMPLE 6

One-half (0.5) pound of the crystalline sodium aluminosilicate described in Example 1 was contacted with 750 cc. of an aqueous solution containing 0.25 pound of the rare earth metal chloride mixture having the composition set forth in Example 1 and 0.25 pound of beryllium chloride at a temperature of 150° F. Nitrogen was bubbled through the mixture to provide continuous agitation. Every 24–48 hours, the solid was filtered, washed and contacted with a fresh solution of the beryllium chloride and rare earth metal chloride. The rate of replacement of the sodium ions with beryllium and rare earth metal ions is shown below.

| No. of solution changes: | Percent weight sodium remaining after exchange |
|---|---|
| 0 | 14.4 |
| 13 | 4.0 |
| 16 | 2.0 |
| 21 | 1.2 |

Exchange was carried out for a period of 60 days, at which time the product was found to contain, on a dry basis, 6.3 weight percent beryllium, 2.9 weight percent cerium together with substantial quantities of lanthanum, praseodymium, neodymium, and samarium. The product obtained was filtered, washed, dried and pelleted to ⅛ x 1/16″ particles. The particles, upon being subjected to crystallinity analysis, were found to contain a substantial amount of crystallinity. The pellets were then heat treated for 3 hours at 1100° F. and steam treated for 10 hours at 1200° F. and a pressure of 15 p.s.i.g. The pellets, after such treatment, were again subjected to crystallinity analysis. It was found that steaming had reduced to a marked extent, the amount of crystallinity, the steamed product possessing only a small amount of crystallinity.

EXAMPLE 7

About 1 pound of the crystalline sodium aluminosilicate described in Example 1 were contacted with 9 liters of an aqueous solution containing 1 pound of the rare earth metal chloride mixture having the composition set forth in Example 1 and 1 pound of calcium chloride (reagent grade) in a continuous exchange column over a period of about 3 weeks at a temperature of 160° F. The exchanged powder was then washed in situ with 10 liters of distilled water. After washing was completed, the catalyst bed was removed from the column and the powder was washed four times using 1 liter of distilled water each time. The product was dried and pelleted to 1/8 x 1/16 inch particles. The resulting product upon analysis was found to contain, on a dry basis, 2.5 weight percent calcium, 4 weight percent rare earth metal, including 0.4 weight percent cerium, and 0.15 weight percent sodium.

The resulting rare earth metal-beryllium alumino-silicate pellets of Example 6 and the rare earth metal-calcium aluminosilicate pellets of Example 7 were employed in the cracking of a Mid-Continent gas oil having a boiling range of 450–935° F. utilizing a temperature of 875° F., a liquid hourly space velocities of 4.5 and 9 and a catalyst to oil ratio of 1.33. The results from such cracking together with comparative results obtained using the rare earth metal alumino-silicates and beryllium aluminosilicate are set forth in Table V below:

ratios. Also, the high gasoline to conversion ratio obtained with this catalyst is unusual. This catalyst also provides an enhanced yield of propene in the $C_3$ fraction. The combination of calcium and rare earth metal, likewise, afforded a cracking catalyst capable of providing an improved yield of gasoline with an accompanying lower yield of coke as compared with the catalyst in which rare earth metal alone had been employed.

The pore size distribution, as determined by nitrogen adsorption, of the combined rare earth metal-beryllium aluminosilicate catalyst of Example 6 and a rare earth metal aluminosilicate catalyst prepared by the procedure of Example 1 and which had been steam-trated for a period of 85 hours at 1200° F. and 15 p.s.i.g. are shown below in Table VI.

Table VI

| Sieve cation | Rare earth metal | Rare earth metal-beryllium |
|---|---|---|
| Wt. percent Na after exchange ($H_2O$-free) | 1.23 | 1.23 |
| Surface area (m.²/gm.) | 449 | 84 |
| Pore size, A.: | Percent pores | Percent pores |
| <10 | 3.3 | 1.8 |
| 10–15 | 6.6 | 1.2 |
| 15–25 | 8.3 | 1.0 |
| 25–50 | 0.6 | 6.2 |
| 50–75 | 4.4 | 4.7 |
| 75–100 | 4.0 | 3.4 |
| 100–200 | 8.5 | 7.5 |
| 200–300 | 5.2 | 2.6 |
| >300 | 59.1 | 71.6 |

Table V

| Cations exchanged | Rare earth metal | Beryllium | Rare earth metal + beryllium | Rare earth metal + calcium |
|---|---|---|---|---|
| Wt. percent Na in original 13X sieve ($H_2O$-free) | 14.4 | 14.4 | 14.4 | 14.4 |
| Wt. percent Na after cation exchange ($H_2O$-free) | 1.23 | 0.8 | 1.23 | 0.15 |
| Steam treat (hrs. at 1200° F., 15 p.s.i.g.) | 10 | None | 10 | 10 |
| CAT-D conditions: | | | | |
| Temp. (° F.) | 875 | 875 | 875 | 875 |
| LHSV | 9.0 | 4.5 | 4.5 | 9.0 |
| Catalyst/oil (vol.) | 1.33 | 1.33 | 1.33 | 1.33 |
| Yields: | | | | |
| Conversion (percent vol.) | 84.2 | 53.3 | 54.8 | 84.1 |
| $C_4$-free gasoline (percent vol.) | 52.7 | 36.3 | 47.9 | 61.1 |
| Total $C_4$ (percent vol.) | 26.6 | 15.8 | 10.6 | 23.6 |
| Dry gas (percent wt.) | 9.1 | 6.7 | 4.2 | 7.1 |
| Coke (percent wt.) | 12.6 | 4.3 | 1.8 | 10.1 |
| Gasoline/coke | 4.2 | 8.4 | 26.6 | 6.1 |
| Light HC analysis (wt. percent chg.): | | | | |
| (a) $C_2$ and lighter | 2.8 | 2.0 | 1.4 | |

| | Wt. | Vol. | Wt. | Vol. | Wt. | Vol. | |
|---|---|---|---|---|---|---|---|
| Hydrogen, percent | 1.1 | 11.0 | 4.4 | 35.0 | 0.7 | 7.7 | |
| Hydrogen sulfide, percent | 2.5 | 1.5 | 4.4 | 2.0 | 4.2 | 2.7 | |
| Methane, percent | 32.1 | 42.7 | 29.2 | 29.0 | 25.9 | 36.1 | |
| Ethylene, percent | 33.1 | 23.9 | 31.0 | 17.7 | 34.9 | 27.9 | |
| Ethane, percent | 31.2 | 20.9 | 31.0 | 16.3 | 34.3 | 25.6 | |
| | 100.0 | 100.0 | 100.0 | 100.0 | 100.0 | 100.0 | |
| (b) $C_3$ | 6.3 | | 4.7 | | 2.8 | | |
| Propene, percent wt. | 49.2 | | 69.6 | | 73.9 | | |
| Propane, percent wt. | 50.8 | | 30.4 | | 26.1 | | |
| | 100.0 | | 100.0 | | 100.0 | | |
| (c) $C_4$ | 17.4 | | 15.8 | | 7.0 | | |
| Isobutane, percent wt. | 54.4 | | 46.3 | | 43.0 | | |
| Butenes, percent wt. | 23.2 | | 42.1 | | 46.6 | | |
| n-Butane, percent wt. | 22.4 | | 11.6 | | 10.4 | | |
| | 100.0 | | 100.0 | | 100.0 | | |

It will be seen from the above data that while the beryllium-rare earth metal exchanged aluminosilicate showed an activity similar to the individually exchanged beryllium material, the use of the combination of beryllium and rare earth metal afforded a cracking catalyst capable of affording an enhanced yield of gasoline with an accompanying low yield of coke. Such fact is particularly evident from a comparison of the gasoline/coke Without being limited by any theory, it is believed that the wide pore size distribution of the present catalysts contribute to their cracking efficiency, affording easy access to the catalyst surface of the hydrocarbon reactant molecules and ready release of the product molecules formed as a result of the catalytic cracking operation.

The catalysts described herein are particularly applicable for use in cracking high nitrogen content charge stocks, for example those having a nitrogen content of 0.7 weight percent or greater.

The rare earth metal, mixed rare earth metal-beryllium and mixed rare earth metal-calcium aluminosilicate catalysts described above were employed in cracking a gas oil charge stock boiling in the range of 600 to 850° F. and characterized by a nitrogen content of approximately 0.75 percent by weight. The results obtained are set forth below in Table VII:

*Table VII*

| Catalyst | Mixed rare earth metal-beryllium aluminosilicate | Rare earth metal-aluminosilicate | Mixed rare earth metal-calcium aluminosilicate | | |
|---|---|---|---|---|---|
| Steamed, hrs | 10 | 162.5 | 10 | 10 | 10 |
| Cracking Conditions: | | | | | |
| Temperature, (° F.) | 875 | 875 | 875 | 875 | 875 |
| LHSV | 1.5 | 4.5 | 1.5 | 2.25 | 3.0 |
| Catalyst/oil (vol.) | 4.0 | 1.33 | 4.0 | 1.33 | 2.0 |
| Yields: | | | | | |
| Conversion (percent vol.) | 25.4 | 29.9 | 85.2 | 39.7 | 54.9 |
| C₄-free gasoline (percent vol.) | 17.1 | 17.0 | 37.9 | 17.2 | 24.1 |
| Total C₄ (percent vol.) | 4.6 | 5.9 | 23.4 | 12.4 | 14.4 |
| Dry gas (percent wt.) | 2.0 | 2.6 | 9.4 | 5.0 | 5.8 |
| Coke (percent wt.) | 6.3 | 9.5 | 31.5 | 15.4 | 20.6 |

It will be evident from the foregoing data that the catalysts described herein possess an unusually high cracking activity when employed in converting a high nitrogen content charge stock, particularly when it is considered that the conversion achieved with a conventional silica-alumina gel cracking catalyst using the same charge stock at a temperature of 850° F., a LHSV of 1.5 and a catalyst to oil ratio of 4.0 was only 18.4 percent volume.

It will be evident from the compositions and catalytic cracking results described herein that improved cracking catalysts having varying amounts of crystallinity and contents of beryllium, rare earth metal, rare earth metal-beryllium mixtures, and rare earth metal-calcium mixtures may be obtained upon base-exchange of an initially crystalline sodium aluminosilicate having a uniform pore structure with openings in the range of 6 to 15 Angstrom units with solutions containing ions of rare earth metal, beryllium, rare earth metal-beryllium mixture or rare earth metal-calcium mixture. It will thus be understood that the above description is merely illustrative of preferred embodiments of the invention, of which many variations may be made by those skilled in the art without departing from the spirit thereof.

We claim:

1. A catalytic composition consisting essentially of beryllium aluminosilicate resulting from base-exchange of a crystalline alkali metal aluminosilicate having uniform pore openings between 6 and 15 Angstrom units with beryllium ions to replace at least about 75 percent of the original alkali metal content of said aluminosilicate with beryllium ions and to effectively reduce the alkali metal content of the resulting composite to below 4 percent by weight, washing the base-exchanged material free of soluble anions, drying and thereafter thermally activating the product by heating at a temperature in the approximate range of 500 to 1200° F. for a period of between about 1 and about 48 hours.

2. A catalytic composition consisting essentially of beryllium aluminosilicate resulting from base-exchange of a crystalline alkali metal aluminosilicate having uniform pore openings between 6 and 15 Angstrom units with beryllium ions to replace at least about 75 percent of the original alkali metal content of said aluminosilicate with beryllium ions and to effectively reduce the alkali metal content of the resulting composite to below 4 percent by weight, washing the base-exchanged material free of soluble anions, drying, thermally activating the product by heating at a temperature in the approximate range of 500 to 1200° F. for a period of between about 1 and about 48 hours and thereafter treating with steam at a temperature between about 1000° and about 1400° F. for a period of at least about 10 hours.

3. A process for cracking a hydrocarbon charge which comprises contacting said charge under catalytic cracking conditions with a catalyst consisting essentially of beryllium aluminosilicate resulting from base-exchange of a crystalline alkali metal aluminosilicate having uniform pore openings between 6 and 15 Angstrom units with beryllium ions to replace at least about 75 percent of the original alkali metal content of said aluminosilicate with beryllium ions and to effectively reduce the alkali metal content of the resulting composite to below 4 percent, washing the base-exchanged material free of soluble anions, drying and thereafter thermally activating the product by heating at a temperature in the approximate range of 500 to 1200° F. for a period of between about 1 and about 48 hours.

4. A process for cracking a hydrocarbon charge which comprises contacting said charge under catalytic cracking conditions with a catalyst consisting essentially of beryllium aluminosilicate resulting from base-exchange of a crystalline alkali metal aluminosilicate having uniform pore openings between 6 and 15 Angstrom units with beryllium ions to replace at least about 90 percent of the original alkali metal content of said aluminosilicate with beryllium ions and to effectively reduce the alkali metal content of the resulting composite to below 1 percent by weight, washing the base-exchanged material free of soluble anions, drying, thermally activating the product by heating at a temperature in the approximate range of 500 to 1200° F. for a period of between about 1 and about 48 hours, and thereafter treating with steam at a temperature between about 1000° F. and about 1400° F. for a period of at least about 10 hours.

References Cited by the Examiner

UNITED STATES PATENTS

| 1,840,450 | 1/32 | Jaeger et al. | 260—676 |
| 2,325,287 | 7/43 | Thomas | 260—683 |
| 2,882,244 | 4/59 | Milton | 260—676 |
| 2,971,903 | 2/61 | Kimberlin et al. | 208—120 |
| 2,982,719 | 5/61 | Gilbert et al. | |

ALPHONSO D. SULLIVAN, *Primary Examiner.*

JOSEPH R. LIBERMAN, *Examiner.*

UNITED STATES PATENT OFFICE
CERTIFICATE OF CORRECTION

Patent No. 3,193,495                                            July 6, 1965

James V. Ellor et al.

It is hereby certified that error appears in the above numbered patent requiring correction and that the said Letters Patent should read as corrected below.

Column 6, line 60, strike out "stream"; same line 60, after "feed" insert -- stream --; column 7, line 4, for "the cut" read -- the wide cut --.

Signed and sealed this 21st day of December 1965.

(SEAL)
Attest:

ERNEST W. SWIDER
Attesting Officer

EDWARD J. BRENNER
Commissioner of Patents